Figure 1:
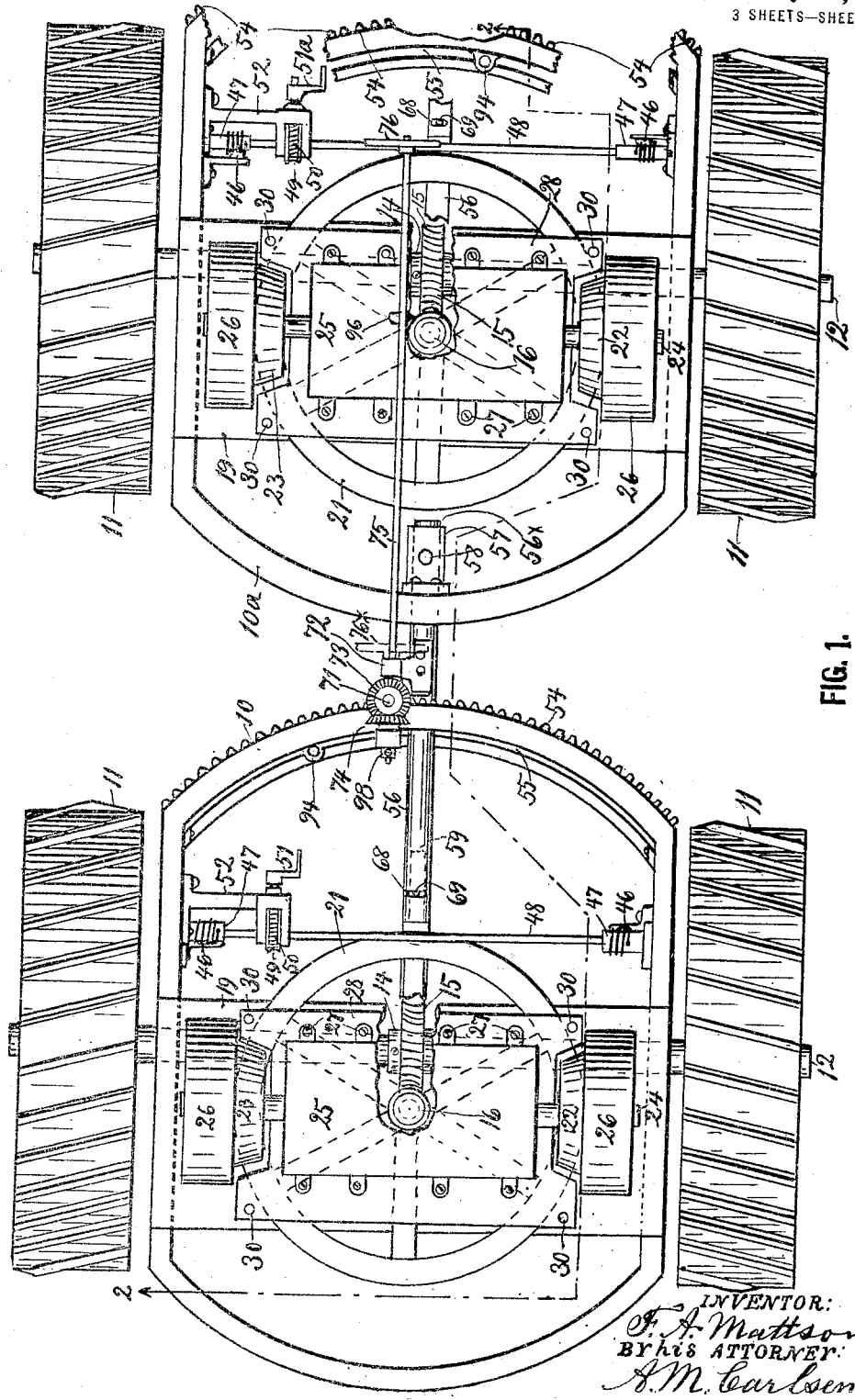

F. A. MATTSON.
FOUR-WHEEL DRIVE TRACTOR.
APPLICATION FILED MAR. 13, 1920.

1,377,497. Patented May 10, 1921.
3 SHEETS—SHEET 1.

INVENTOR:
F. A. Mattson
BY his ATTORNEY
A. M. Carlsen

F. A. MATTSON.
FOUR-WHEEL DRIVE TRACTOR.
APPLICATION FILED MAR. 13, 1920.
1,377,497.
Patented May 10, 1921.
3 SHEETS—SHEET 2.
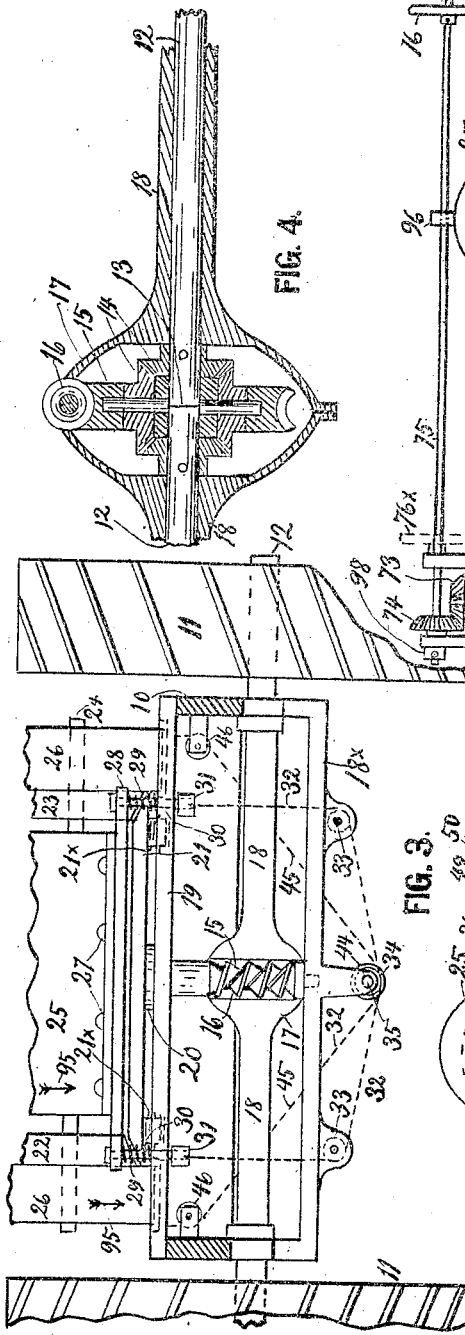
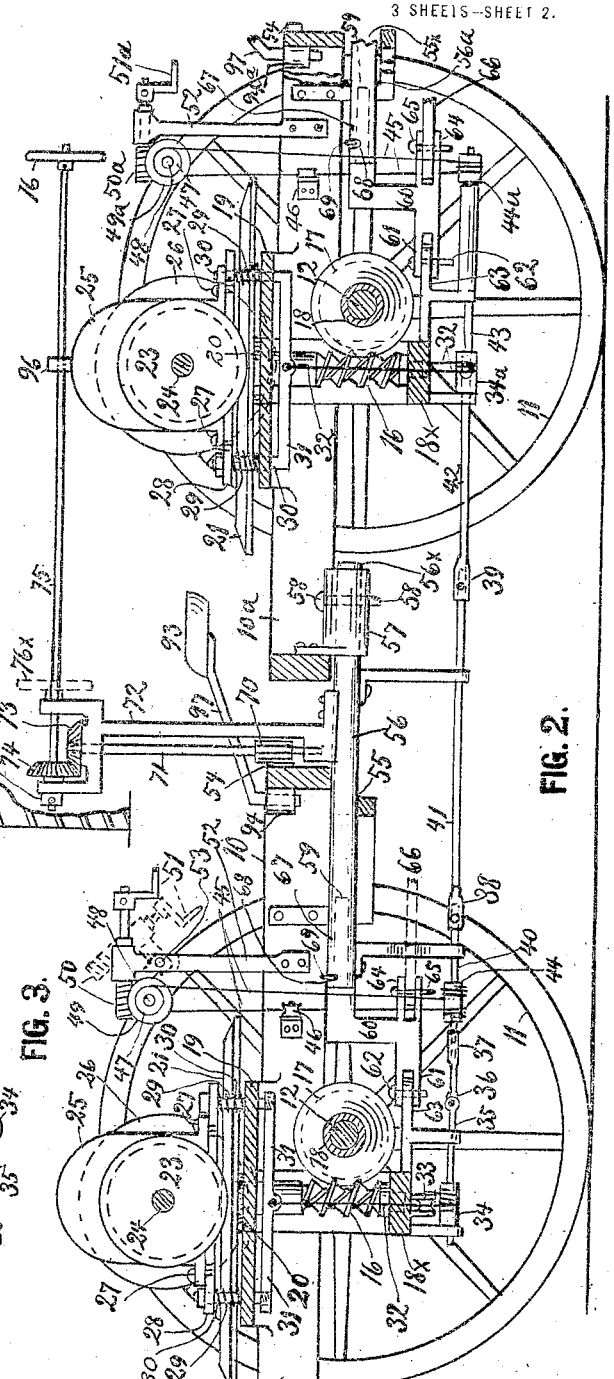
INVENTOR:
F. A. Mattson
BY his ATTORNEY:
A. M. Carlsen.

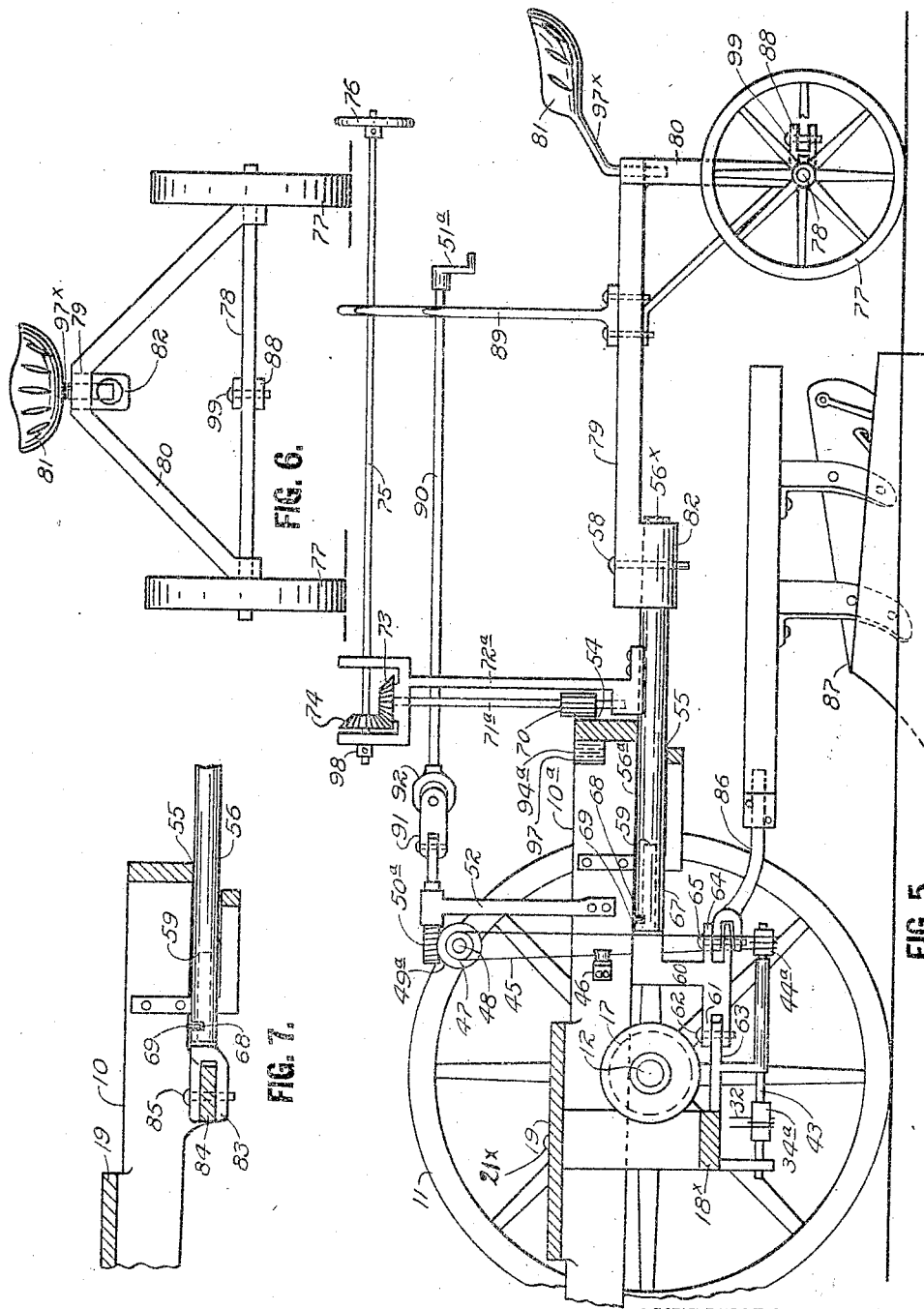

UNITED STATES PATENT OFFICE.

FRANKLIN A. MATTSON, OF ROCHESTER, MINNESOTA.

FOUR-WHEEL-DRIVE TRACTOR.

1,377,497.  Specification of Letters Patent.  Patented May 10, 1921.

Application filed March 13, 1920. Serial No. 365,638.

*To all whom it may concern:*

Be it known that I, FRANKLIN A. MATTSON, a citizen of the United States, residing at Rochester, in the county of Olmsted and State of Minnesota, have invented a new and useful Four-Wheel-Drive Tractor, of which the following is a specification.

My invention relates to tractors, and the objects are; first to provide a tractor which will draw by four traction wheels; second to make such tractor readily separable into two smaller tractors for light work. A third object is to provide a tractor with frictional connection between the engine and the traction wheels. Other objects will appear from the specification and claims to follow; reference being had to the accompanying drawings, in which:

Figure 1 is a top view of my improved tractor in its complete form for drawing large gang-plows or for other heavy pulling; except that the casing of the differential gear is omitted. Fig. 2 is a section on the line 2—2 in Fig. 1. Fig. 3 is a front end elevation of Fig. 2. Fig. 4 is an enlarged longitudinal diametrical horizontal section of the differential gear and adjacent parts of either one of the two combined tractors or tractor sections. Fig. 5 is a partly sectional side view showing the same as either one of the tractor sections in Fig. 2, especially the rear section $10^a$ detached from the other section and employed for drawing a plow or doing other light work, and the riding attachment in such cases attached to each section. Fig. 6 is a rear end elevation of the riding attachment. Fig. 7 is a portion of Fig. 2, showing a modification of the manner in which the reach may be attached to the tractor frame pulling it.

Referring to the drawing by reference numerals, I will as far as practical employ the same numerals on the corresponding parts in the front and rear section of the complete tractor, since the two sections are practically alike; only where clearness requires it I may give the numeral in the rear section an exponent. Thus 10 designates the main frame of the front section and $10^a$ the main frame of the rear section. Each main frame is supported by a pair of traction wheels 11 and an axle 12, which is divided at the middle (as at 13 in Fig. 4) and driven by a differential gear 14, of which the main wheel is a worm gear 15 driven by a vertical worm-screw 16, all mounted in the usual casing 17 having the sleeves 18.

The worm screw 16 is journaled in a lower cross bar $18^x$, and an upper cross bar or platform 19 of the frame. Upon the said platform rests the hub 20 of a beveled friction wheel 21 which is fixed on the worm screw and arranged to be rotated alternately in opposite directions by two smaller friction wheels 22, 23 which are fixed on the shaft 24 of an engine 25. 26 are the fly wheels of the engine. $21^x$ are roller bearings supporting the wheel 21.

The engine is secured at 27 upon a base plate 28 which rests on four coil springs 29 and is provided with posts 30 slidable in the springs and in holes in the platform 19. Said posts are connected in pairs to horizontal bars 31, from each of which extends a chain or other flexible element 32, over guide pulleys 33 to a small drum 34, on which either the right or left chain may be wound alternately while the other chain is being unwound therefrom. Said drum is fixed on a shaft 35, which has a universal joint 36, a sliding joint 37 and other coupling joints 38, 39 connecting several shaft sections, 40, 41, 42, which are used when the two motor sections are combined.

The shaft sections 40 and 43 are each provided with a fixed drum 44 or $44^a$. Fixed to the drum 44, and likewise to the drum $44^a$, are chains or cables 45, which are guided by pulleys 46 and have their upper ends secured to drums 47 fixed on a shaft 48. On the latter shaft is fixed a worm gear 49, which is operated by a worm-screw 50 having a hand crank 51. The shaft of screw 50 is journaled in a post 52, which on the front section of the tractor has a clamp joint 53 enabling the upper end of the post to be tilted with the screw 50 out of the worm gear 49. This is to leave the worm gear 49 idle when the worm gear $49^a$ is in use, as will presently be more fully described.

Each frame 10, $10^a$ has its rear end segmental in form and provided with a curved rack 54, and therebelow provided with a horizontal slot 55 fitting loosely a reach 56 or $56^a$, the latter is almost omitted in the rear frame in Fig. 1. The rear end of the reach 56 is held firmly in a socket 57 of the rear frame 10ª by a pin 58. In the front end of the reach is journaled an extension 59 of an offset reach member 60 having a fork 61 adapted to be coupled by a pin 62 to an arm 63 of the frame bar 18. It also has a rearwardly pointing fork 64 with a pin 65 for engaging the clevis 66 of a plow or other implement or thing to be drawn by the tractor. The socket shaped portion 67 of the reach is provided in its upper side with a transverse slot 68 for a pin 69 secured in the extension 59; this is to allow either frame 10, 10ª the necessary freedom to lean toward either side when on uneven ground.

For purpose of steering the tractor the rack 54 is engaged by a gear pinion 70, best shown near the middle of Fig. 2; said pinion is fixed on a vertical shaft 71, which is journaled in a frame arm 72 of any suitable height, and has a fixed bevel gear 73 driven by a bevel gear 74, which is fixed on a shaft 75, whose rear end is provided with a hand wheel 76.

In Figs. 5 and 6 is shown a riding attachment composed of two ground wheels 77, an axle 78, a frame 80 with a seat 81 upon it, and a pole 79 having at its front end a socket 82 adapted to fit upon the rear end portion 56ˣ of the reach that is going to draw it, and to receive the pin 58.

In Fig. 7 is shown that the reach 56, instead of having the gooseneck 60 may have a fork 83 straddling a special cross bar 84 of the main frame, and a pin 85 dropped into said parts, while a clevis or draw bar like 86 of a plow 87 (see Fig. 5) may be attached directly to the arm 63 by the pin 65, then placed as 62.

When the riding attachment is employed as shown in Fig. 5, and a plow, harrow or cultivator is drawn either by the frame arm 88 of the frame axle 78 of the riding attachment, the pole 79 is provided with a support 89 for the shaft 75 and also for a special shaft extension 90, which then receives upon its rear end the crank 51, as 51ª, said crank being removed from the worm screw 50 and replaced by a socket 91, which is secured to the front end of the shaft section 90 by universal joint 92.

In the operation of the tractor for heavy work like drawing a large gang of plows or a harvester, the two engines and the four traction wheels are employed and the operator occupies a seat like 93 but placed in the socket 94 to the right in Figs. 1 and 2, the worm screw 50 is thrown out of gear, as shown in dotted line in Fig. 2 and the crank 51ª and screw 50ª operated so as to pull downward by the cables 45 and 32 alternately one of the bars 31 and thereby one of the friction wheels 22 or 23 into contact with the friction wheel 21, with the arrangement shown in Fig. 3. If the engine runs in the direction indicated by the arrows 95, the wheel 22 will cause the tractor to travel forward, and if it be desired to travel backward, the wheel 23 is thrown into frictional contact with wheel 21.

If for light work it is desired to make two tractors out of the one, the pin 58 is removed and the joint 38 of the shaft 40—41 in Fig. 2 is separated and the shaft section 41 removed. The upper shaft 75 may be lifted out of its support 96 and the tractor sections separated. Each section may now be given a riding attachment as in Fig. 5. But as to the front section 10 it is not necessary for the operator to remove the seat 93 to the riding attachment, since he may occupy it where it is shown with the seat post at 97 and not at 97ˣ in Fig. 5. While thus seated he may operate the crank 51 and also the hand wheel 76, the latter being moved to the position 76ˣ either by pushing the shaft 75 forward in the collar 98 or by exchanging it for a shorter shaft. When thus riding on the main frame 10 the riding attachment still serves the purpose of preventing tilting of the frame 10 on its axle 12, and it further serves to draw harrows or other implements which may be attached to it by the pin 99. In some cases the wheels 77 may be fixed upon the frame of a harrow or gang plows, or they may be removed and the axle 78 or the legs of the frame 80 be attached to the plow frame. This may be done whether the seat is at 97 or at 97ˣ.

Having thus described my invention, what I claim is:

1. A tractor having four traction wheels and two motors arranged to operate all four of said wheels simultaneously, said tractor being readily separable into two smaller tractors or sections each with two traction wheels and one of the motors, and an attachment for each tractor section to keep it in horizontal position when detached from the other section of the tractor.

2. The structure specified in claim 1 and means for steering and for starting and for reversing said tractor both as a whole and as divided into two sections while riding on either section or on the riding attachment thereto.

3. In a tractor, a pair of traction wheels, an axle fixed therein and divided transversely into two sections, a differential gear arranged to rotate the adjacent ends of said shaft sections, said differential gear having a worm gear and a worm screw driving it, an engine and operative connection between the engine and the worm screw, said operative connection comprising a comparatively large beveled friction wheel fixed on the worm screw, and a shaft crossing the friction wheel and having two smaller friction wheels normally held near but not in contact with the large wheel and means for engaging alternately either one of the small wheels with the large wheel so as to rotate the latter in either direction.

4. The structure specified in claim 3, said shaft in the small wheels being the shaft of the engine, and means for tilting the engine so as to bring the said wheels to engage frictionally as stated.

5. The structure specified in claim 4, said engine having its base supported on partly compressed springs under each end thereof and said tilting means being attached to said base and arranged to so pull on the base as to slightly compress the springs nearest the small friction wheel that is to be applied to the large one.

In testimony whereof I affix my signature,

FRANKLIN A. MATTSON.